United States Patent
Grundvig et al.

(10) Patent No.: US 8,498,071 B2
(45) Date of Patent: Jul. 30, 2013

(54) SYSTEMS AND METHODS FOR INTER-TRACK ALIGNMENT

(75) Inventors: Jeffrey P. Grundvig, Loveland, CO (US); Jason D. Byrne, Boulder, CO (US); Jefferson Singleton, Westminster, CO (US)

(73) Assignee: LSI Corporation, San Jose, CA (US)

( * ) Notice: Subject to any disclaimer, the term of this patent is extended or adjusted under 35 U.S.C. 154(b) by 224 days.

(21) Appl. No.: 13/173,088

(22) Filed: Jun. 30, 2011

(65) Prior Publication Data

US 2013/0003214 A1 Jan. 3, 2013

(51) Int. Cl.
G11B 27/36 (2006.01)
G11B 5/09 (2006.01)

(52) U.S. Cl.
USPC .............................................. 360/31; 360/51

(58) Field of Classification Search
None
See application file for complete search history.

(56) References Cited

U.S. PATENT DOCUMENTS

| | | |
|---|---|---|
| 3,973,182 A | 8/1976 | Kataoka |
| 3,973,183 A | 8/1976 | Kataoka |
| 4,024,571 A | 5/1977 | Dischert et al. |
| 4,777,544 A | 10/1988 | Brown et al. |
| 5,130,866 A | 7/1992 | Klaassen et al. |
| 5,237,325 A | 8/1993 | Klein et al. |
| 5,278,703 A | 1/1994 | Rub et al. |
| 5,309,357 A | 5/1994 | Stark et al. |
| 5,341,249 A | 8/1994 | Abbott et al. |
| 5,377,058 A | 12/1994 | Good et al. |
| 5,521,948 A | 5/1996 | Takeuchi |
| 5,523,902 A | 6/1996 | Pederson |
| 5,594,341 A | 1/1997 | Majidi-Ahy et al. |
| 5,668,679 A | 9/1997 | Swearingen et al. |
| 5,696,639 A | 12/1997 | Spurbeck et al. |
| 6,069,583 A | 12/1997 | Silvestrin et al. |
| 5,781,129 A | 7/1998 | Schwartz et al. |
| 5,787,125 A | 7/1998 | Mittle |

(Continued)

FOREIGN PATENT DOCUMENTS

| | | |
|---|---|---|
| FR | 2904168 A1 | 1/2008 |
| WO | WO 03/047091 | 6/2003 |
| WO | WO 2008/009620 | 1/2008 |

OTHER PUBLICATIONS

U.S. Appl. No. 12/663,319, filed Dec. 7, 2009, Ratnakar Aravind.

(Continued)

*Primary Examiner* — Regina N Holder
(74) *Attorney, Agent, or Firm* — Hamilton DeSanctis & Cha

(57) ABSTRACT

Various embodiments of the present invention provide systems and methods for data processing. As an example, a data processing circuit is discussed that includes: a servo address mark count circuit, a user sync mark count circuit, and an offset calculation circuit. The servo address mark count circuit is operable to provide: a first count corresponding to a first servo address mark within a first track of a storage medium, a second count corresponding to a second servo address mark within the first track, a third count corresponding to a third servo address mark within a second track of the storage medium, and a fourth count corresponding to a fourth servo address mark within the second track. The user sync mark count circuit is operable to provide: a fifth count corresponding to a first user sync mark within the first track, and to provide a sixth count corresponding to a second user sync mark within the second track. The offset calculation circuit is operable to calculate an offset between the first track and the second track based at least in part on the first count, the second count, the third count, the fourth count, the fifth count, and the sixth count.

25 Claims, 7 Drawing Sheets

U.S. PATENT DOCUMENTS

| | | | |
|---|---|---|---|
| 5,798,885 A | 8/1998 | Saiki et al. |
| 5,835,295 A | 11/1998 | Behrens |
| 5,844,920 A | 12/1998 | Zook et al. |
| 5,852,524 A | 12/1998 | Glover et al. |
| 5,892,632 A | 4/1999 | Behrens et al. |
| 5,955,783 A | 9/1999 | Ben-Efraim et al. |
| 5,970,104 A | 10/1999 | Zhong et al. |
| 5,986,830 A | 11/1999 | Hein |
| 5,987,562 A | 11/1999 | Glover |
| 6,009,549 A | 12/1999 | Bliss et al. |
| 6,023,383 A | 2/2000 | Glover et al. |
| 6,081,397 A | 6/2000 | Belser |
| 6,111,712 A | 8/2000 | Vishakhadatta et al. |
| 6,208,478 B1 | 3/2001 | Chiu et al. |
| 6,269,058 B1 | 7/2001 | Yamanoi et al. |
| 6,278,591 B1 | 8/2001 | Chang et al. |
| 6,400,518 B1 | 6/2002 | Bhaumik et al. |
| 6,404,829 B1 | 6/2002 | Sonu |
| 6,411,452 B1 | 6/2002 | Cloke |
| 6,441,661 B1 | 8/2002 | Aoki et al. |
| 6,490,110 B2 | 12/2002 | Reed et al. |
| 6,493,162 B1 | 12/2002 | Fredrickson |
| 6,519,102 B1 | 2/2003 | Smith et al. |
| 6,530,060 B1 | 3/2003 | Vis et al. |
| 6,603,622 B1 | 8/2003 | Christiansen et al. |
| 6,606,048 B1 | 8/2003 | Sutardja |
| 6,633,447 B2 | 10/2003 | Franck et al. |
| 6,646,822 B1 | 11/2003 | Tuttle et al. |
| 6,657,802 B1 | 12/2003 | Ashley et al. |
| 6,775,529 B1 | 8/2004 | Roo |
| 6,788,484 B2 | 9/2004 | Honma |
| 6,813,108 B2 | 11/2004 | Annampedu et al. |
| 6,816,328 B2 | 11/2004 | Rae |
| 6,839,014 B2 | 1/2005 | Uda |
| 6,856,183 B2 | 2/2005 | Annampedu |
| 6,876,511 B2 | 4/2005 | Koyanagi |
| 6,912,099 B2 | 6/2005 | Annampedu et al. |
| 6,963,521 B2 | 11/2005 | Hayashi |
| 6,999,257 B2 | 2/2006 | Takeo |
| 6,999,264 B2 | 2/2006 | Ehrlich |
| 7,002,761 B1 | 2/2006 | Sutardja et al. |
| 7,002,767 B2 | 2/2006 | Annampedu et al. |
| 7,038,875 B2 | 5/2006 | Lou et al. |
| 7,054,088 B2 | 5/2006 | Yamazaki et al. |
| 7,072,137 B2 | 7/2006 | Chiba |
| 7,082,005 B2 | 7/2006 | Annampedu et al. |
| 7,092,462 B2 | 8/2006 | Annampedu et al. |
| 7,116,504 B1 | 10/2006 | Oberg |
| 7,126,776 B1 | 10/2006 | Warren, Jr. et al. |
| 7,136,250 B1 | 11/2006 | Wu et al. |
| 7,154,689 B1 | 12/2006 | Shepherd et al. |
| 7,167,328 B2 | 1/2007 | Annampedu et al. |
| 7,180,693 B2 | 2/2007 | Annampedu et al. |
| 7,187,739 B2 | 3/2007 | Ma |
| 7,191,382 B2 | 3/2007 | James et al. |
| 7,193,544 B1 | 3/2007 | Fitelson et al. |
| 7,193,798 B2 | 3/2007 | Byrd et al. |
| 7,199,961 B1 | 4/2007 | Wu et al. |
| 7,203,013 B1 | 4/2007 | Han et al. |
| 7,206,146 B2 | 4/2007 | Flynn et al. |
| 7,230,789 B1 | 6/2007 | Brunnett et al. |
| 7,248,425 B2 | 7/2007 | Byun et al. |
| 7,253,984 B1 | 8/2007 | Patapoutian et al. |
| 7,265,937 B1 | 9/2007 | Erden et al. |
| 7,286,313 B2 | 10/2007 | Erden et al. |
| 7,301,717 B1 | 11/2007 | Lee et al. |
| 7,308,057 B1 | 12/2007 | Patapoutian |
| 7,323,916 B1 | 1/2008 | Sidiropoulos et al. |
| 7,362,536 B1 | 4/2008 | Liu et al. |
| 7,375,918 B1 | 5/2008 | Shepherd et al. |
| 7,411,531 B2 | 8/2008 | Aziz et al. |
| 7,420,498 B2 | 9/2008 | Barrenscheen |
| 7,423,827 B2 | 9/2008 | Neville et al. |
| 7,446,690 B2 | 11/2008 | Kao |
| 7,499,238 B2 | 3/2009 | Annampedu |
| 7,525,460 B1 | 4/2009 | Liu et al. |
| 7,529,320 B2 | 5/2009 | Byrne et al. |
| 7,558,177 B2 | 7/2009 | Ogura et al. |
| 7,602,568 B1 | 10/2009 | Katchmart |
| 7,616,395 B2 | 11/2009 | Yamamoto |
| 7,620,101 B1 | 11/2009 | Jenkins |
| 7,630,155 B2 | 12/2009 | Maruyama et al. |
| 2002/0001151 A1 | 1/2002 | Lake |
| 2002/0150179 A1 | 10/2002 | Leis et al. |
| 2002/0176185 A1 | 11/2002 | Fayeulle et al. |
| 2002/0181377 A1 | 12/2002 | Nagata et al. |
| 2003/0090971 A1 | 5/2003 | Gushima et al. |
| 2003/0095350 A1 | 5/2003 | Annampedu et al. |
| 2005/0157415 A1 | 1/2004 | Chiang et al. |
| 2005/0243455 A1 | 4/2004 | Annampedu |
| 2004/0179460 A1 | 9/2004 | Furumiya et al. |
| 2005/0046982 A1 | 3/2005 | Liu et al. |
| 2007/0071152 A1 | 9/2005 | Chen et al. |
| 2007/0104300 A1 | 9/2006 | Esumi et al. |
| 2007/0230015 A1 | 9/2006 | Yamashita et al. |
| 2007/0064847 A1 | 3/2007 | Gaedke et al. |
| 2007/0103805 A1 | 5/2007 | Hayashi et al. |
| 2007/0183073 A1 | 8/2007 | Sutardja et al. |
| 2008/0212715 A1 | 10/2007 | Chang |
| 2007/0263311 A1 | 11/2007 | Smith |
| 2007/0280059 A1 | 12/2007 | Cheng et al. |
| 2008/0056403 A1 | 3/2008 | Wilson |
| 2008/0080082 A1 | 4/2008 | Erden et al. |
| 2008/0266693 A1 | 10/2008 | Bliss et al. |
| 2009/0002862 A1 | 1/2009 | Park et al. |
| 2009/0142620 A1 | 6/2009 | Yamamoto et al. |
| 2009/0245448 A1 | 10/2009 | Ran et al. |
| 2009/0274247 A1 | 11/2009 | Galbraith et al. |

OTHER PUBLICATIONS

U.S. Appl. No. 12/838,601, filed Aug. 19, 2010, Wilson, Ross.
U.S. Appl. No. 12/851,475, filed Aug. 5, 2010, Annampedu, Viswanath.
U.S. Appl. No. 12/887,327, filed Sep. 21, 2010, Liu et al.
U.S. Appl. No. 12/894,221, filed Sep. 30, 2010, Yang et al.
U.S. Appl. No. 12/946,048, filed Nov. 15, 2010, Yang et al.
U.S. Appl. No. 12/947,962, filed Nov. 17, 2010, Liu et al.
U.S. Appl. No. 12/946,033, filed Nov. 15, 2010, Yang et al.
U.S. Appl. No. 12/955,789, filed Nov. 29, 2010, Annampedu et al.
U.S. Appl. No. 12/955,821, filed Nov. 29, 2010, Annampedu et al.
U.S. Appl. No. 12/972,904, filed Dec. 20, 2010, Viswanath Annampedu.
U.S. Appl. No. 13/100,021, filed May 3, 2011, Xia, Haitao et al.
U.S. Appl. No. 13/113,210, filed May 23, 2001, Zhang, Xun et al.
U.S. Appl. No. 13/014,754, filed Jan. 27, 2011, Viswanath Annampedu.
U.S. Appl. No. 13/009,067, filed Jan. 19, 2011, Zhang, Xun et al.
U.S. Appl. No. 13/050,048, filed Mar. 17, 2011, Xia, Haitao et al.
U.S. Appl. No. 13/096,873, filed Apr. 28, 2011, Wilson, Ross S.
U.S. Appl. No. 13/173,088, filed Jun. 30, 2011, Grundvig, et al.
U.S. Appl. No. 13/186,267, filed Jul. 19, 2011, Xia, Haitao et al.
U.S. Appl. No. 13/242,983, filed Sep. 23, 2011, Grundvig, Jeffery P.
Annampedu, V. et al, "Adaptive Algorithms for Asynchronous Detection of Coded Servo Signals Based on Interpolation", IEEE Transactions on Magnetics, vol. 41, No. 10, Oct. 2005.
Aziz and Annampedu, "Asynchronous Maximum Likelihood (ML) Detection of Servo repeatable Run Out (RRO) Data" Magnetics Conf. IEEE InternationalMay 2006.
Aziz et al "Interpolation Based Maximum-Likelihood(ML) Detection of Asynchronous Servo Repeatable Run Out (RRO) Data", Digest, IEEE Int'l Magnetics Conf. vol. 42, No. 10 Oct. 2006.
Kryder, M. et al "Heat Assisted Magnetic Recording" Proc. IEEE, vol. 96, No. 11, p. 1810, Nov. 2008.
Weller et al "Thermal Limits in Ultrahigh-density Magnetic Recording" IEEE Trans. Magn. vol. 35, No. 6, p. 4423, Nov. 1999.

SYSTEMS AND METHODS FOR INTER-TRACK ALIGNMENT

BACKGROUND OF THE INVENTION

The present invention relates generally to accessing storage media, and more particularly without limitation to systems and methods accessing data from adjacent tracks on a storage medium.

Data storage systems often store data arranged in tracks. FIG. 1 shows a storage medium 1 with two exemplary tracks 20, 22 indicated as dashed lines. The tracks are segregated by servo data written within wedges 18, 19 (i.e., servo wedges). These wedges include data and supporting bit patterns 10 that are used for control and synchronization of the read/write head assembly over a desired location on storage medium 1. In particular, these wedges generally include a preamble pattern 11 followed by a servo address mark 12 (SAM). Servo address mark 12 is followed by a Gray code 13, and Gray code 12 is followed by burst information 14. It should be noted that while two tracks and two wedges are shown, hundreds of each would typically be included on a given storage medium. User data 16 is stored at bit period locations between successive servo wedges.

Data from two adjacent tracks 20, 22 often causes inter-track interference. This inter-track interference may be mitigated where the data from the adjacent track(s) is known. However, data in adjacent tracks may not be aligned resulting in an inability to accurately cancel interference from an adjacent track. Such misalignment may be evident where sync marks 17 in adjacent user data regions 16 are misaligned by an offset 99. Offset 99 may be caused by a number of factors including, but not limited to, mechanical jitter, track to track clock drift, or the like. Of note, while sync marks 17 may not be aligned, servo data 10a and servo data 10c, and servo data 10b and servo data 10d are generally aligned. Inability to calculate and compensate for offset 99 undermines the accuracy of inter-track interference mitigation. Failure to properly account for inter-track interference results in diminished accuracy of read back data.

Hence, for at least the aforementioned reasons, there exists a need in the art for advanced systems and methods for mitigating inter-track interference.

BRIEF SUMMARY OF THE INVENTION

The present invention relates generally to accessing storage media, and more particularly without limitation to systems and methods accessing data from adjacent tracks on a storage medium.

Some embodiments of the present inventions provide data processing circuits that include: a storage medium having at least a first track and a second track, a servo address mark count circuit, a user sync mark count circuit, and an offset calculation circuit. The servo address mark count circuit is operable to provide: a first count corresponding to a first servo address mark within the first track, a second count corresponding to a second servo address mark within the first track, a third count corresponding to a third servo address mark within the second track, and a fourth count corresponding to a fourth servo address mark within the second track. The user sync mark count circuit is operable to provide: a fifth count corresponding to a first user sync mark within the first track, and to provide a sixth count corresponding to a second user sync mark within the second track. The offset calculation circuit is operable to calculate an offset between the first track and the second track based at least in part on the first count, the second count, the third count, the fourth count, the fifth count, and the sixth count.

In some instances of the aforementioned embodiments, the circuit further includes a user sync mark detector circuit operable to identify a user sync mark pattern in a data set derived from the storage medium. In some cases, the user sync mark count circuit includes: a user data clock generation circuit operable to provide a user data clock synchronized to a user data set derived from the storage medium; a sync counter circuit operable to increment upon assertion of the user data clock to yield a sync count; and a sync location memory operable to store the sync count upon identification of the user sync mark pattern.

In various instances of the aforementioned embodiments, the circuit further includes a servo address mark detector circuit operable to identify a servo address mark in a data set derived from the storage medium. In some cases, the servo address mark count circuit includes: a servo clock generation circuit operable to provide a servo data clock synchronized to a servo data set derived from the storage medium; a servo counter circuit operable to increment upon assertion of the servo data clock to yield a servo count; and a servo address mark location memory operable to store the servo count upon identification of the servo address mark.

In one or more instances of the aforementioned embodiments, the offset calculation circuit is operable to calculate a difference between the fifth count and the sixth count to yield a sync offset. In such cases, the offset calculation circuit is further operable to calculate a difference between the first count and the third count to yield a first servo address mark offset, and to calculate a difference between the second count and the fourth count to yield a second servo address mark offset. In some cases, the offset calculation circuit is further operable to calculate the offset between the first track and the second track at the second user sync mark in accordance with the following equation:

$$\text{Sync Offset} * Td - \frac{(\text{Second } SAM \text{ Offset}) * Xs + (\text{First } SAM \text{ Offset}) * (SMOD - Xs)}{SMOD} Ts,$$

where Xs is the location where the track to track offset is to be determined expressed as a number of periods of the servo data clock after a sector address mark (SAM), SMOD is the number of bit periods of the servo data clock between the third servo address mark and the fourth servo address mark, Td is the period of the user data clock, and Ts is the period of the servo data clock. In other cases, the user sync mark count circuit is further operable to provide a seventh count corresponding to a third user sync mark within the first track, and to provide a eighth count corresponding to a fourth user sync mark within the second track; the sync offset is a first sync offset, the offset calculation circuit is further operable to calculate a difference between the seventh count and the eighth count to yield a second sync offset; and the offset calculation circuit is further operable to calculate the offset between the first track and the second track at X between the second user sync mark and the fourth user sync mark in accordance with the following equation:

$$\frac{(\text{Second } Sync \text{ Offset}) * X + (\text{First } Sync \text{ Offset}) * (RMOD - X)}{RMOD} Td -$$

-continued $$\frac{(SAM\ Offset\ B)*Xs+(SAM\ Offset\ A)*(SMOD-Xs)}{SMOD}Ts,$$

where X is the location in the second track where the track to track offset is to be determined expressed in a number periods of a user data clock after a user sync mark, Xs is the location corresponding to the second user sync mark expressed in clock periods of a servo data clock from the third servo address mark, SMOD is the number of bit periods of the servo data clock between the third servo address mark and the fourth servo address mark, RMOD is the number of bit periods of the user data clock between the second user sync mark and the fourth user sync mark, Td is the period of the user data clock, and Ts is the period of the servo data clock.

In some instances of the aforementioned embodiments, the offset calculation circuit compensates for clock drift between the first track and the second track. In some cases, the first track and the second track are adjacent. In one or more instances of the aforementioned embodiments, the circuit is implemented as part of an integrated circuit. In some cases, the circuit is implemented as part of a storage device.

Other embodiments of the present invention provide data processing circuits that include a location marking circuit and an offset calculation circuit. The location marking circuit is operable to provide: a first count corresponding to a first servo address mark within a first track of the storage medium, a second count corresponding to a second servo address mark within the first track, a third count corresponding to a third servo address mark within a second track of the storage medium, a fourth count corresponding to a fourth servo address mark within the second track; a fifth count corresponding to a first user sync mark within the first track, a sixth count corresponding to a second user sync mark within the second track. The offset calculation circuit operable to calculate an offset between the first track and the second track based at least in part on the first count, the second count, the third count, the fourth count, the fifth count, and the sixth count.

Yet other embodiments of the present invention provide storage devices that include: a storage medium, a head assembly, and a read channel circuit. The storage medium includes a first track and a second track. The head assembly is disposed in relation to the storage medium and is operable to generate an analog input corresponding to information on the storage medium. The read channel circuit is operable to receive the analog input and to provide a first data set corresponding to the first track and a second data set corresponding to the second data set. The read channel circuit includes a servo address mark count circuit, a user sync mark count circuit, and an offset calculation circuit. The servo address mark count circuit operable to provide: a first count corresponding to a first servo address mark within the first data set, a second count corresponding to a second servo address mark within the first data set, a third count corresponding to a third servo address mark within the second data set, and a fourth count corresponding to a fourth servo address mark within the second data set. The user sync mark count circuit is operable to provide: a fifth count corresponding to a first user sync mark within the first data set, and to provide a sixth count corresponding to a second user sync mark within the second data set. The offset calculation circuit is operable to calculate an offset between the first data set and the second data set based at least in part on the first count, the second count, the third count, the fourth count, the fifth count, and the sixth count.

This summary provides only a general outline of some embodiments of the invention. Many other objects, features, advantages and other embodiments of the invention will become more fully apparent from the following detailed description, the appended claims and the accompanying drawings.

BRIEF DESCRIPTION OF THE DRAWINGS

A further understanding of the various embodiments of the present invention may be realized by reference to the figures which are described in remaining portions of the specification. In the figures, like reference numerals are used throughout several figures to refer to similar components. In some instances, a sub-label consisting of a lower case letter is associated with a reference numeral to denote one of multiple similar components. When reference is made to a reference numeral without specification to an existing sub-label, it is intended to refer to all such multiple similar components.

DETAILED DESCRIPTION OF THE INVENTION

Figure 1:
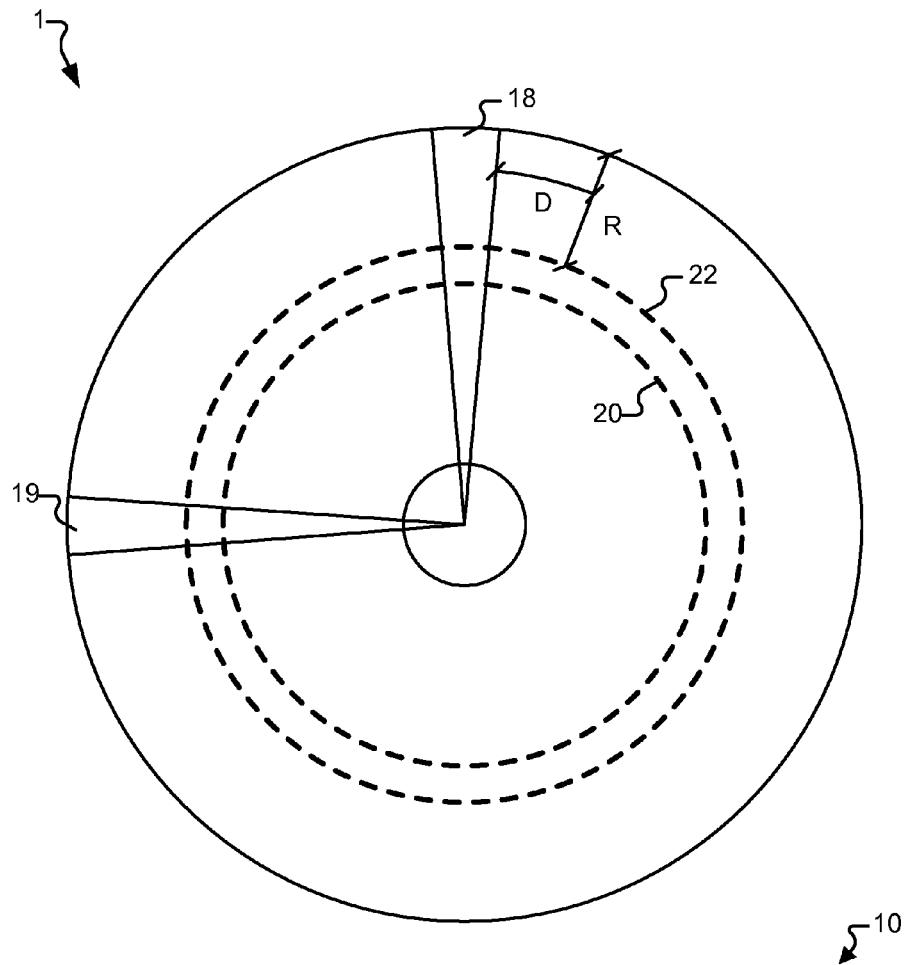
FIG. 1 is a block diagram of a known magnetic storage medium and sector data scheme.
Figure 1:
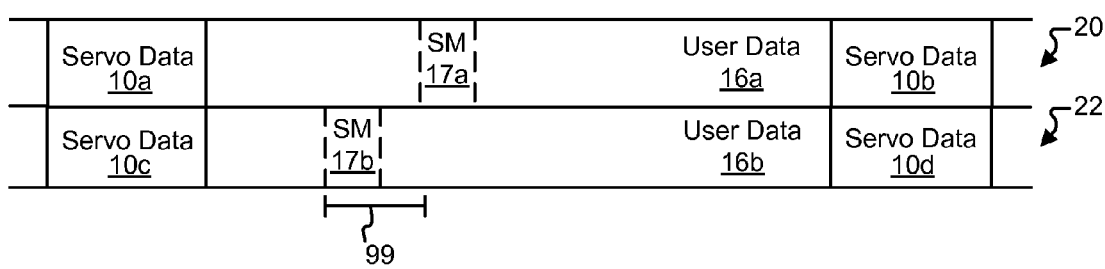

The present invention relates generally to accessing storage media, and more particularly without limitation to systems and methods accessing data from adjacent tracks on a storage medium.

In some applications such as shingled magnetic recording it is may be desirable to determine the relative alignment of user data across adjacent tracks. For example in shingled magnetic recording where inter-track interference may need to be cancelled, the ability to determine or correlate the relative phase of adjacent track to track user data is a component of being able to cancel the inter-track interference. Some embodiments of the present invention store relative distance from corresponding pairs of servo address marks and user data synchronization marks. The relative distance for successive tracks can be used to calculate a relative alignment between tracks that is useful in calculating and mitigating inter-track interference. In addition, by interpolating using distances between servo address marks and corresponding user data synchronization marks at any position along a given track may be determined.

Various embodiments of the present invention provide systems and methods for time stamp storage of servo address mark and user data sync mark positions using disk locked clocks included in a read channel circuit. The stored time stamps may be used to calculate a relative alignment between adjacent tracks that may be used for selecting corresponding bit periods in adjacent tracks for calculating and mitigating inter-track interference. The frequency of the data in a servo wedge is typically different from the frequency in a user data region. Thus, the servo address marks and user sync marks are processed using separate clocks. In some cases, the relative track to track phase relationship of interest may be determined by reading two adjacent tracks in two consecutive revolutions of the storage media and the relative track to track alignment may be calculated using a known ratio of the frequency of the data in the servo wedge and the frequency of the data in the user data region. Alternatively, if the ratio of the frequency of the data in the servo wedge and the frequency of the data in the user data region is programmed such that there is at least a once around repetitive phase relationship between the two clocks then the sequence as to when the tracks are read is not important so long as the synthesizer frequency ratio is not changed between reading the first and second track of interest.

Servo wedges are typically placed on a hard disk during the manufacturing process and once written are never rewritten so that they may serve as permanent location marks to provide a reference in order to determine the head position in both a radial and circumferential direction. The circumferential position has often been used to perform disk locked clock functions where an internal channel counter and phase measurement circuit are used to monitor and record the location of each servo address mark or SAM when it comes along. This time stamping of the servo address mark fields is performed with the servo clock which is typically a different frequency than that of the user data placed between servo wedges. The user data synchronization mark position and phase could also be recorded or time stamped in a similar manner using a counter and phase measurement circuit which operates on a user data clock.

When adjacent tracks are read the combination of the servo address mark and user sync mark time stamps may be used to determine the relative alignment of the user data in the adjacent tracks. FIG. 1 above shows an example where the servo wedges on adjacent tracks are aligned, but the user synchronization marks on adjacent tracks are not aligned. Of note, due to frequency drift, the misalignment of subsequent user synchronization marks (i.e., additional sync marks 17 within user data region 16) may be greater or less than that shown. Various embodiments of the present invention account for this track to track clock drift by measuring a distance from a servo address mark (a reasonably aligned position from track to track) and a user synchronization mark that may be significantly mis-aligned from track to track. These distances may be combined to provide a relative track to track offset (e.g., offset 99 of FIG. 1).

Figure 2:
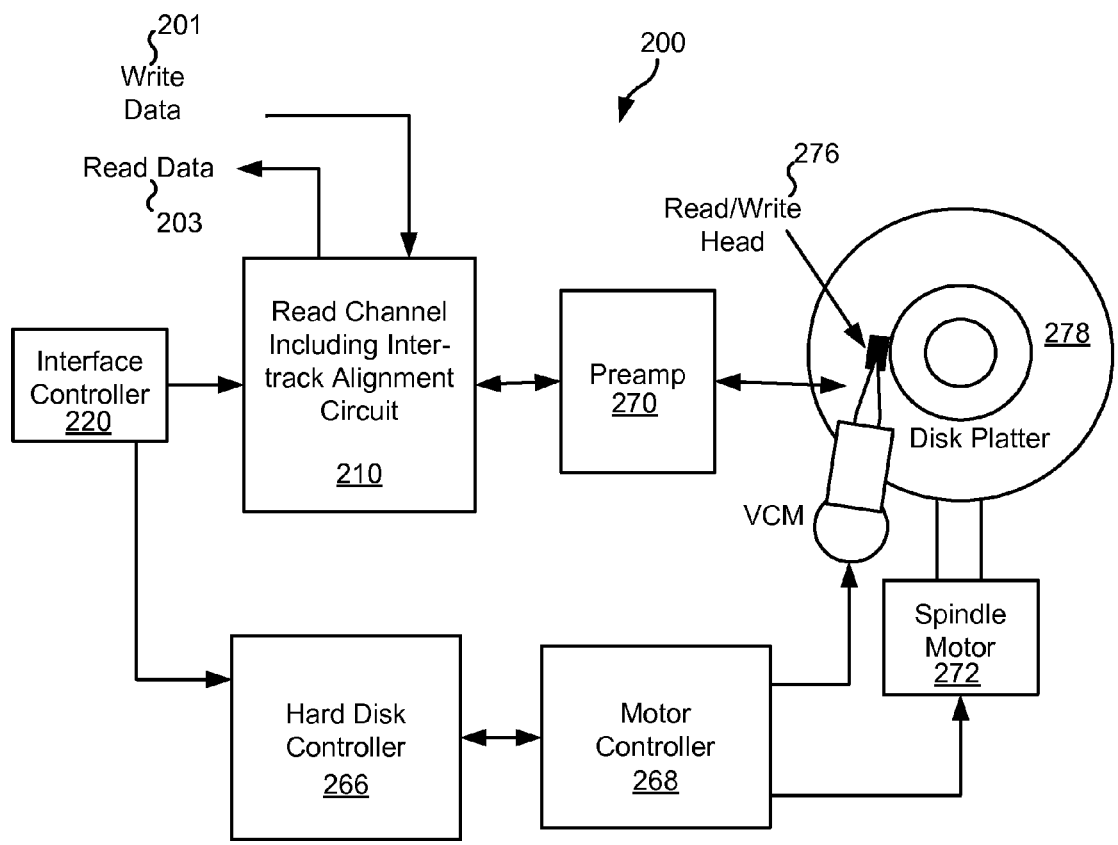
FIG. 2 shows a storage system including a read channel circuit with an inter-track alignment circuit in accordance with some embodiments of the present invention.

Turning to FIG. 2, a storage system 200 including a read channel circuit 210 including an inter-track alignment circuit is shown in accordance with some embodiments of the present invention. Storage system 200 may be, for example, a hard disk drive. Storage system 200 also includes a preamplifier 270, an interface controller 220, a hard disk controller 266, a motor controller 268, a spindle motor 272, a disk platter 278, and a read/write head 276. Interface controller 220 controls addressing and timing of data to/from disk platter 278. The data on disk platter 278 consists of groups of magnetic signals that may be detected by read/write head assembly 276 when the assembly is properly positioned over disk platter 278. In one embodiment, disk platter 278 includes magnetic signals recorded in accordance with either a longitudinal or a perpendicular recording scheme.

In a typical read operation, read/write head assembly 276 is accurately positioned by motor controller 268 over a desired data track on disk platter 278. Motor controller 268 both positions read/write head assembly 276 in relation to disk platter 278 and drives spindle motor 272 by moving read/write head assembly to the proper data track on disk platter 278 under the direction of hard disk controller 266. Spindle motor 272 spins disk platter 278 at a determined spin rate (RPMs). Once read/write head assembly 278 is positioned adjacent the proper data track, magnetic signals representing data on disk platter 278 are sensed by read/write head assembly 276 as disk platter 278 is rotated by spindle motor 272. The sensed magnetic signals are provided as a continuous, minute analog signal representative of the magnetic data on disk platter 278. This minute analog signal is transferred from read/write head assembly 276 to read channel module 264 via preamplifier 270. Preamplifier 270 is operable to amplify the minute analog signals accessed from disk platter 278. In turn, read channel circuit 210 decodes and digitizes the received analog signal to recreate the information originally written to disk platter 278. This data is provided as read data 203 to a receiving circuit. As part of decoding the received information, read channel circuit 210 performs an inter-track interference mitigation that includes aligning a known data set from an adjacent track with the data set from the currently read track. Such alignment may be done using, for example, one of the circuits described below in relation to FIGS. 3-5, and/or the method discussed below in relation to FIG. 6. A write operation is substantially the opposite of the preceding read operation with write data 201 being provided to read channel circuit 210. This data is then encoded and written to disk platter 278.

It should be noted that storage system 200 may be integrated into a larger storage system such as, for example, a RAID (redundant array of inexpensive disks or redundant array of independent disks) based storage system. It should also be noted that various functions or blocks of storage system 200 may be implemented in either software or firmware, while other functions or blocks are implemented in hardware.

Figure 3:
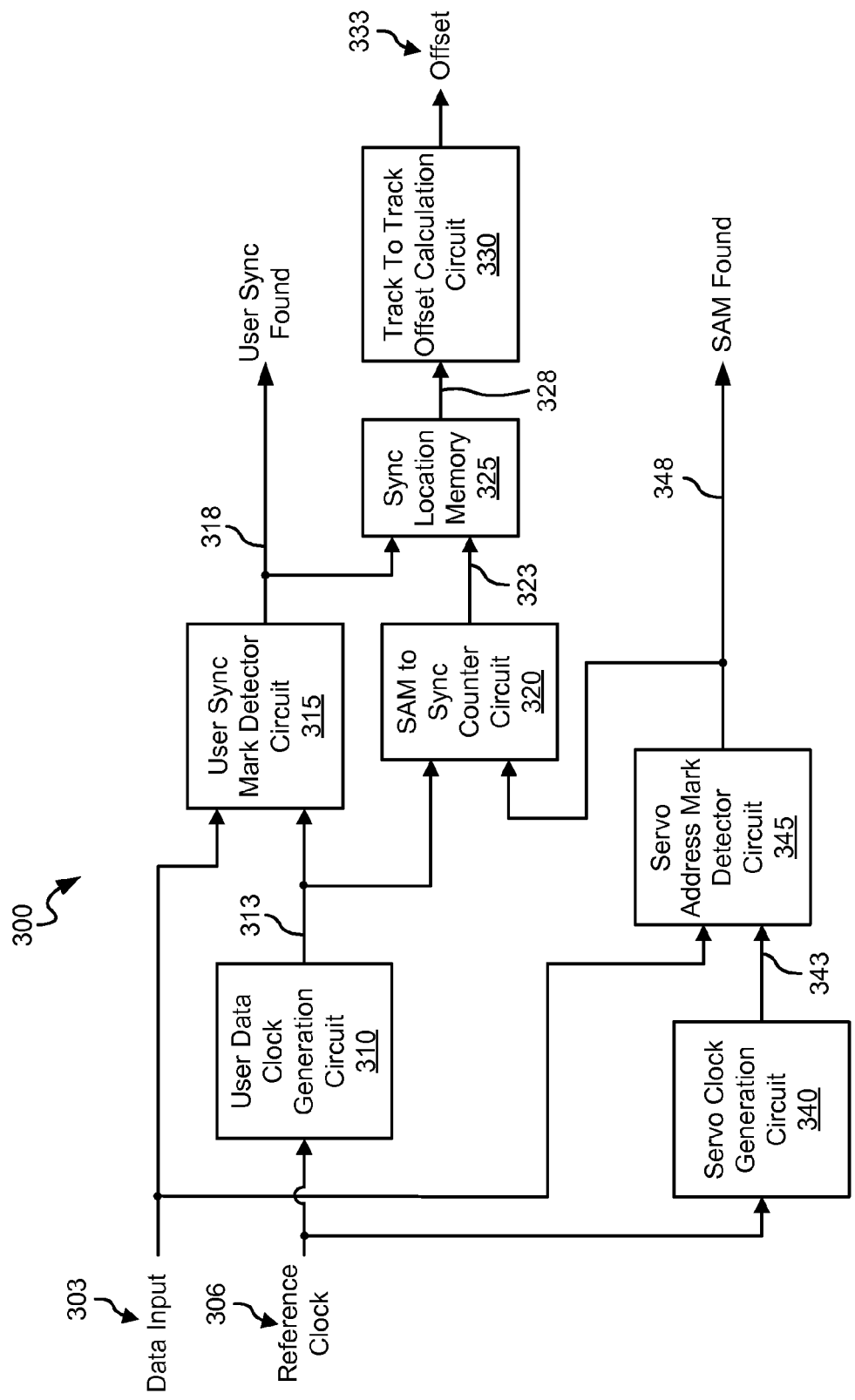
FIG. 3 depicts an inter-track alignment circuit in accordance with one or more embodiments of the present invention.

Turning to FIG. 3, an inter-track alignment circuit 300 is shown in accordance with one or more embodiments of the present invention. Inter-track alignment circuit 300 includes a user data clock generation circuit 310 that receives a data input 303 and a reference clock 306. Data input 303 is digital data derived from a storage medium, and includes both user data and servo data. As just one example, user data input 303 may be similar to the data from track 20 described in FIG. 1 above including servo data portions (i.e., servo data 10a and servo data 10b) with a user data portion (i.e., user data 16a) there between. The user data portion includes one or more sync marks (i.e., sync mark 17a). Based upon the disclosure provided herein, one of ordinary skill in the art will recognize a variety of formats of data input 303 that may be used in relation to different embodiments of the present invention. User data clock generation circuit 310 generates a user data clock 313 that exhibits the phase and frequency of a user data portion included in data input 303. User data clock generation circuit 310 may be any circuit known in the art that is capable of generating a clock with a phase and frequency corresponding to an input data set. In some embodiments of the present invention, user data clock generation circuit 310 may be a digital phase lock loop circuit as is known in the art that is capable of generating a clock with a phase and frequency aligned to data input 303. Based upon the disclosure provided herein, one of ordinary skill in the art will recognize a variety of circuits that are capable of generating a clock synchronized to an input data stream.

Inter-track alignment circuit 300 includes a user sync mark detector circuit 315 that queries a user data portion of data input 303 synchronous to user data clock 313 to identify a user sync mark (e.g., user sync mark 17a of user data region 16a). When a user sync mark is identified, user sync mark detector circuit 315 asserts a user sync found signal 318. Any circuit known in the art for identifying a user sync mark may be used in relation to embodiments of the present invention.

In addition, inter-track alignment circuit 300 includes a servo clock generation circuit 340 that receives data input 303 and reference clock 306. Servo clock generation circuit 340 generates a servo data clock 343 that exhibits the phase and frequency of a servo data portion included in data input 303. Servo clock generation circuit 340 may be any circuit known in the art that is capable of generating a clock with a phase and frequency corresponding to an input data set. In some embodiments of the present invention, servo clock generation circuit 340 may be a digital phase lock loop circuit as is known in the art that is capable of generating a clock with a phase and frequency aligned to data input 303. Based upon the disclosure provided herein, one of ordinary skill in the art will recognize a variety of circuits that are capable of generating a clock synchronized to an input data stream.

Inter-track alignment circuit 300 includes a servo address mark detector circuit 345 that queries a servo data portion of data input 303 synchronous to servo data clock 343 to identify a servo address mark (e.g., SAM 12 of servo data 10a). When a servo address mark is identified, servo address mark detector circuit 345 asserts a SAM found signal 348. Any circuit known in the art for identifying a user sync mark may be used in relation to embodiments of the present invention.

A SAM to sync counter circuit 345 is included that is a counter that is reset whenever SAM found signal 348 is asserted, and is incremented each time user data clock 313 is asserted. Thus, SAM to sync counter circuit 345 provides a count output 323 that indicates a distance in clock cycles of user data clock 313 from the assertion of SAM found signal 348. When user sync found signal 318 is asserted, count output 323 is stored to a sync location memory 325. Thus, the value stored in sync location memory 325 corresponds to a distance in clock cycles of user data clock 313 from SAM found 348 to user sync found 318 (e.g., a distance from SAM 12 of servo data 10a to sync mark 17a). This distance is provided as a SAM to sync distance 328.

SAM to sync distance 328 is provided to a track to track offset calculation circuit 330 that calculates an offset 333 between sync marks in adjacent user data portions (e.g., offset 99). This offset may be calculated in accordance with the following equation:

Offset 333=SAM to sync distance 328 for track
N−SAM to sync distance 328 for track N+1, where track N is one track on the storage medium and track N+1 is another track on the storage medium that is adjacent to track N. It should be noted that track to track offset calculation circuit 330 may calculate an offset between a sync mark in a currently read track with a corresponding sync mark in a preceding track and a sync mark in a succeeding track. Offset 333 is provided to an inter-track interference mitigation circuit (not shown) where it is used to select the appropriate data (i.e., bit periods) from preceding and/or succeeding tracks for a given bit period in the current read track for use in calculating and mitigating inter-track interference. As an example, inter-track interference may be calculated and compensated using circuits and/or approaches discussed in U.S. Provisional Patent App. No. 61/453,676 entitled "Systems and Methods for Track to Track Interference Compensation" and filed Mar. 17, 2011 by Mathew et al. The entirety of the aforementioned application is assigned to an entity common hereto and is incorporated herein by reference for all purposes.

As an example, suppose that data input 303 includes data from a first track with a first servo data portion and a second servo data portion each including servo data, and a user data portion between the first servo data portion and the second servo data portion that includes three user sync marks interspersed between user data, and data from a second track also with a first servo data portion and a second servo data portion each including servo data, and a user data portion between the first servo data portion and the second servo data portion that includes three user sync marks interspersed between user data. In such an example, sync location memory 325 stores three distances as shown in the following table with example values.

| Track Number | SAM to First User Sync Mark Distance | SAM to Second User Sync Mark Distance | SAM to Third User Sync Mark Distance |
| --- | --- | --- | --- |
| Track N | 4000 | 4120 | 4240 |
| Track N + 1 | 4004 | 4128 | 4252 |

Using these values, three relative offsets are calculated by track to track offset calculation circuit 330 and provided as offset 333 (i.e., offset 333a, offset 333b, and offset 333c). The three offsets are calculated as follow:

Offset 333a=4004−4000=+4 bit periods from track N to track N+1;

Offset 333b=4128−4120=+8 bit periods from track N to track N+1; and

Offset 333c=4252−4240=+12 bit periods from track N to track N+1.

These calculated values can then be used to align bit periods in track N with those in track N+1 for inter-track interference calculation and compensation.

Figure 4A:
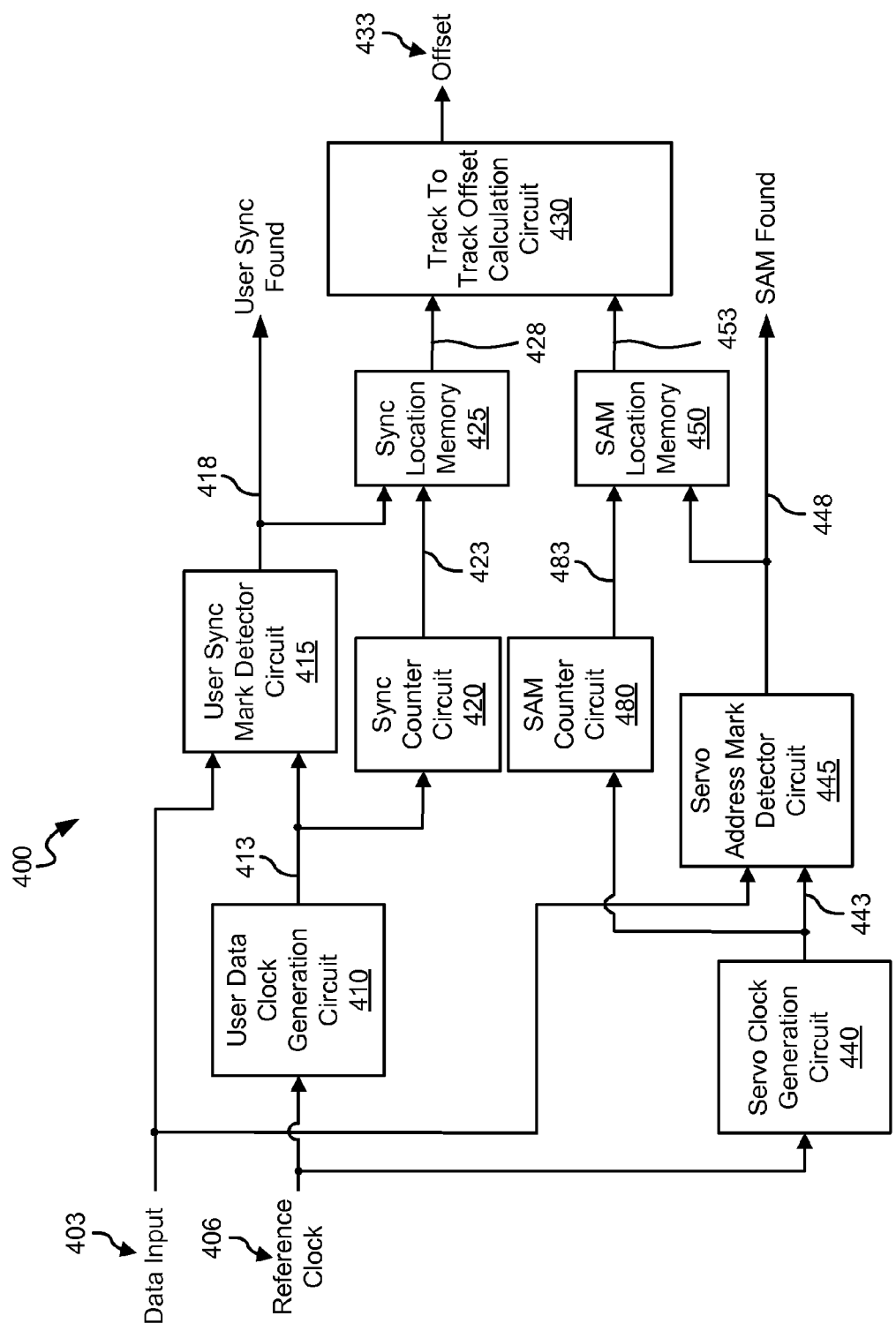
FIG. 4*a* depicts another inter-track alignment circuit in accordance with some embodiments of the present invention.

Turning to FIG. 4a, another inter-track alignment circuit 400 is depicted in accordance with some embodiments of the present invention. In contrast to the circuit of FIG. 3 above, inter-track alignment circuit 400 calculates an offset between servo address marks on adjacent tracks. It is assumed that the servo address marks are aligned from track to track, and that any offset is due to clock drift between tracks, and the offset is used to compensate for the clock drift.

Inter-track alignment circuit 400 includes a user data clock generation circuit 410 that receives a data input 403 and a reference clock 406. Data input 403 is digital data derived from a storage medium, and includes both user data and servo data. As just one example, user data input 403 may be similar to the data from track 20 described in FIG. 1 above including servo data portions (i.e., servo data 10a and servo data 10b) with a user data portion (i.e., user data 16a) there between. The user data portion includes one or more sync marks (i.e., sync mark 17a). Based upon the disclosure provided herein, one of ordinary skill in the art will recognize a variety of formats of data input 403 that may be used in relation to different embodiments of the present invention. User data clock generation circuit 410 generates a user data clock 413 that exhibits the phase and frequency of a user data portion included in data input 403. User data clock generation circuit 410 may be any circuit known in the art that is capable of generating a clock with a phase and frequency corresponding to an input data set. In some embodiments of the present invention, user data clock generation circuit 410 may be a digital phase lock loop circuit as is known in the art that is capable of generating a clock with a phase and frequency aligned to data input 403. Based upon the disclosure provided herein, one of ordinary skill in the art will recognize a variety of circuits that are capable of generating a clock synchronized to an input data stream.

Inter-track alignment circuit 400 includes a user sync mark detector circuit 415 that queries a user data portion of data input 403 synchronous to user data clock 413 to identify a user sync mark (e.g., user sync mark 17a of user data region 16a). When a user sync mark is identified, user sync mark detector circuit 415 asserts a user sync found signal 418. Any circuit known in the art for identifying a user sync mark may be used in relation to embodiments of the present invention.

In addition, inter-track alignment circuit 400 includes a servo clock generation circuit 440 that receives data input 403 and reference clock 406. Servo clock generation circuit 440 generates a servo data clock 443 that exhibits the phase and frequency of a servo data portion included in data input 403. Servo clock generation circuit 440 may be any circuit known in the art that is capable of generating a clock with a phase and frequency corresponding to an input data set. In some embodiments of the present invention, servo clock generation circuit 440 may be a digital phase lock loop circuit as is known in the art that is capable of generating a clock with a phase and frequency aligned to data input 403. Based upon the disclosure provided herein, one of ordinary skill in the art will recognize a variety of circuits that are capable of generating a clock synchronized to an input data stream.

Inter-track alignment circuit 400 includes a servo address mark detector circuit 445 that queries a servo data portion of data input 403 synchronous to servo data clock 443 to identify a servo address mark (e.g., SAM 12 of servo data 10a). When a servo address mark is identified, servo address mark detector circuit 445 asserts a SAM found signal 448. Any circuit known in the art for identifying a user sync mark may be used in relation to embodiments of the present invention.

A sync counter circuit 420 is included that is a free running counter that is incremented upon each assertion of user data clock 413 until a maximum value is achieved and then rolls over to zero. The maximum may be set to the number of bit periods in a user data region between servo wedges. The value of sync counter circuit 420 is provided as a count output 423 to a sync location memory 425 where it is stored each time user sync mark found 418 is asserted. A SAM counter circuit 480 is included that is a free running counter that is incremented upon each assertion of servo data clock 443 until a maximum value is achieved and then rolls over to zero. The maximum may be set to the number of bit periods in a servo wedge. The value of SAM counter circuit 480 is provided as a count output 483 to a SAM location memory 450 where it is stored each time SAM found 448 is asserted. The values stored in sync location memory 425 are provided to a track to track offset calculation circuit 430 as sync locations 428, and the values stored in SAM location memory 450 are provided to a track to track offset calculation circuit 430 as SAM locations 453.

Track to track offset calculation circuit 430 calculates an offset between corresponding servo address marks using stored SAM locations 453 from adjacent tracks, and calculates offsets between corresponding user sync marks using stored sync locations 428 from adjacent tracks. A combination of the aforementioned offsets are used together to calculate a user data offset at a given bit period which is provided as an offset output 433. Servo address mark offset may be calculated in accordance with the following equation:

Servo Address Mark Offset (SAM Offset)=SAM Location 453 for track N–SAM Location 453 for track N+1.

The SAM offset corresponding to a first servo wedge is referred to as SAM Offset A, and a SAM offset corresponding to a subsequent servo wedge is referred to as SAM Offset B. Of note, servo address marks for successive tracks are assumed to be aligned and any offset is an indication of clock drift and not an actual physical offset.

User sync mark offsets may be calculated in accordance with the following equation:

User Sync Mark Offset (Sync Offset)=Sync Location 423 for track N–SAM Location 423 for track N+1.

Of note, multiple user sync marks may occur between two successive servo address marks (i.e., servo wedges. In such a case, the offset corresponding to the first user sync mark is referred to as Sync Offset A, the offset corresponding to the next user sync mark is referred to as Sync Offset B, and so on for each successive user sync mark. The sync offsets may indicate a combination of clock drift and actual physical offset.

Figure 4B:
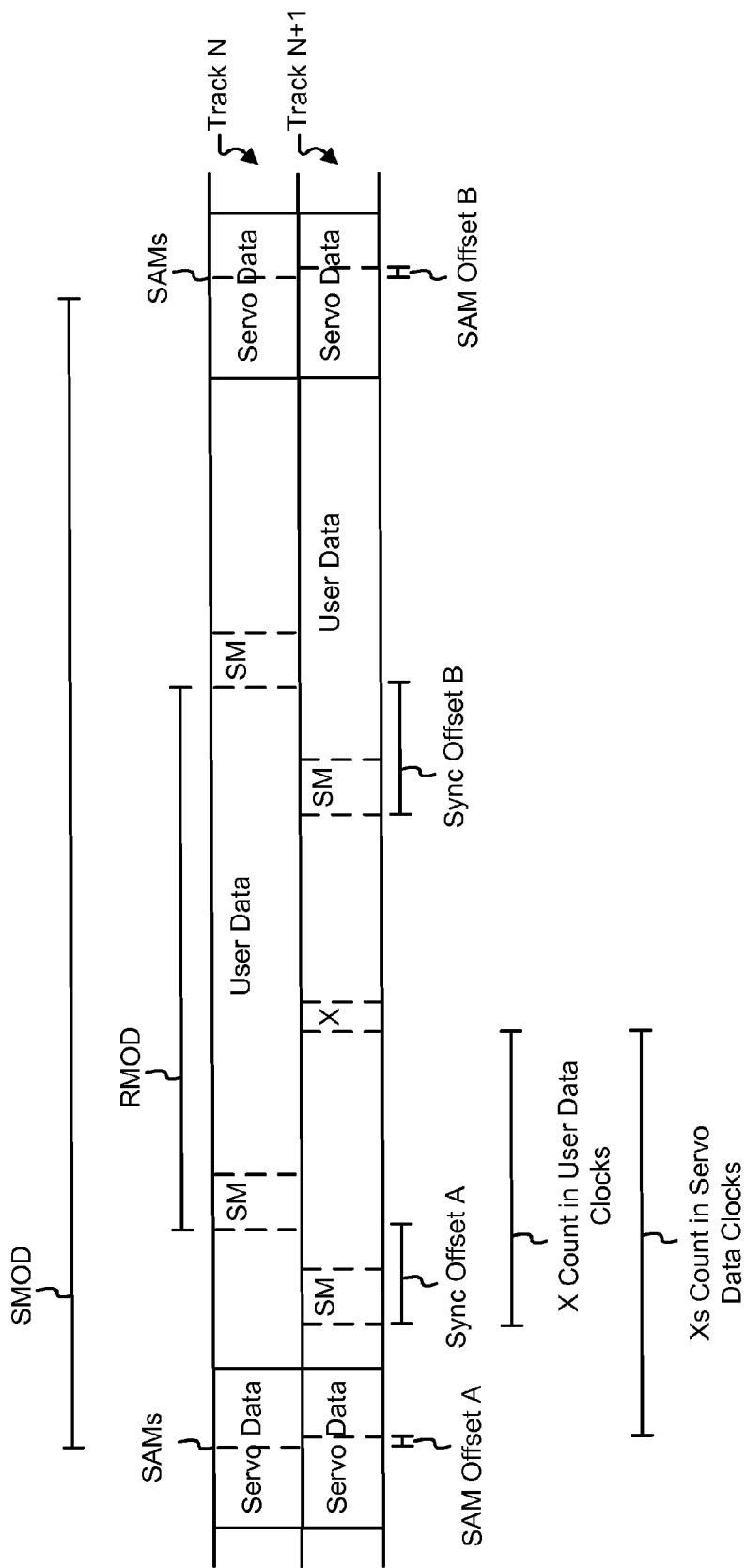
FIG. 4*b* shows an example data set that may be used in relation to the inter-track alignment circuit of FIG. 4*a*.

The aforementioned sync offsets and SAM offset are used together to calculate an offset at a given bit period using multiple user sync marks occurring between servo wedges in accordance with the following equation:

$$\text{Offset at Bit Period } X = \frac{(Sync \text{ Offset } B) * X + (Sync \text{ Offset } A) * (RMOD - X)}{RMOD} Td - \frac{(SAM \text{ Offset } B) * Xs + (SAM \text{ Offset } A) * (SMOD - Xs)}{SMOD} Ts$$

where X is a location of interest expressed in terms of the number of bit periods after a user sync mark where track alignment is to be determined; Xs is the bit period or location of X in terms of how many servo bit periods (i.e., counts of servo data clock 443) from a preceding servo address mark; RMOD is the number of bit periods between the user sync marks (SM) on either side of the bit period X (i.e., the number of user bit periods between the user sync mark corresponding to Sync Offset B and the user sync mark corresponding to Sync Offset A); SMOD is the number of servo bit periods between the servo address marks on either side of the bit period X; Td is the period of user data clock 413; and Ts is the period of servo data clock 443. An example of the aforementioned variables is shown in FIG. 4b. Of note, while FIG. 4b shows an example having two user sync marks between successive servo data wedges, other numbers of user sync marks may be distributed between servo data wedges. The calculated offset at bit period X is provided as Offset 433.

Offset 433 may be provided to an inter-track interference mitigation circuit (not shown) where it is used to select the appropriate data (i.e., bit periods) from preceding and/or succeeding tracks for a given bit period in the current read track for use in calculating and mitigating inter-track interference. As an example, inter-track interference may be calculated and compensated using circuits and/or approaches discussed in U.S. Provisional Patent App. No. 61/453,676 entitled "Systems and Methods for Track to Track Interference Compensation" and filed Mar. 17, 2011 by Mathew et al. The entirety of the aforementioned application is assigned to an entity common hereto and is incorporated herein by reference for all purposes.

As an example, suppose that data input 403 includes data from a Track N with a first servo data portion and a second servo data portion each including servo data, and a user data portion between the first servo data portion and the second servo data portion that includes two user sync marks (SM) interspersed between user data, and data from a Track N+1 also with a first servo data portion and a second servo data portion each including servo data, and a user data portion between the first servo data portion and the second servo data portion that includes two user sync marks (SM) interspersed between user data. In such an example, sync location memory 425 stores two distances (First User Sync Mark Time Stamp and Second User Sync Mark Time Stamp) and SAM location memory 450 stores two distances (First SAM Time Stamp and Second SAM Time Stamp as shown in the following table with example values.

| Track Number | First User Sync Mark Time Stamp | Second User Sync Mark Time Stamp | First SAM Time Stamp | Second SAM Time Stamp |
|---|---|---|---|---|
| Track N | 7000 | 7120 | 3000 | 3200 |
| Track N + 1 | 7004 | 7128 | 3001 | 3202 |

Using these values, relative alignments of the first sync marks and the second sync marks can be calculated in accordance with the following equations:

$$\text{Bit } X \text{ Alignment} = \frac{(7128-7120)*X + (7004-7000)*(RMOD-X)}{RMOD} Td - \frac{(3202-3200)*Xs + (3001-3000)*(SMOD-Xs)}{SMOD} Ts.$$

Where Bit X (i.e., the bit location of interest) is located, for example, $4/7$ of the distance between the first servo address mark and the second servo address mark, the above mentioned equation simplifies to:

$$\text{Bit } X \text{ Alignment} = \frac{(7128-7120)*X + (7004-7000)*(RMOD-X)}{RMOD} Td - \frac{(3202-3200)*4 + (3001-3000)*3}{7} Ts.$$

In this case, the terms Xs and (SMOD-Xs) are used to effectively perform a linear interpolation based upon how many servo data clock periods lie between the identified servo address marks which come before and after the point of interest. As such, the sum of the two numbers in the numerator Xs and (SMOD-Xs) is equivalent to the number in the denominator SMOD. Further, where the Bit X (i.e., the bit location of interest) is located, for example, $3/5$ of the distance between the first user sync mark and the second user sync mark, the above mentioned equation simplifies to:

$$\text{Bit } X \text{ Alignment} = \frac{(7128-7120)*3 + (7004-7000)*2}{5} Td - \frac{(3202-3200)*4 + (3001-3000)*3}{7} Ts = \frac{16}{5} Td - \frac{5}{7} Ts$$

In this case, the terms X and (RMOD-X) are used to effectively perform a linear interpolation based upon how many user data clock periods lie between the identified user sync marks which come before and after the point of interest. As such, the sum of the two numbers in the numerator X and (RMOD-X) is equivalent to the number in the denominator RMOD.

Where only relative sync alignment is desired, a similar approach to that discussed above may be implemented in track to track offset calculation circuit. In particular, relative user sync mark offset may be calculated in accordance with the following equation that accounts for clock drift:

$$\text{Relative User } Sync \text{ Offset} = Sync \text{ Offset } A * Td - \frac{(SAM \text{ Offset } B)*Xs + (SAM \text{ Offset } A)*(SMOD-Xs)}{SMOD} Ts,$$

where the term Sync Offset A*Td accounts for the raw offset, and the term $$\frac{(SAM \text{ Offset } B)*Xs + (SAM \text{ Offset } A)*(SMOD-Xs)}{SMOD} Ts$$

accounts for track to track clock drift. Using the example numbers from the table above, the relative offset between the first user sync marks of track N and track N+1 is as follows:

$$\text{Relative User } Sync \text{ Offset} = (7004-7000)*Td - \frac{(3202-3200)*Xs + (3001-3000)*(SMOD-Xs)}{SMOD} Ts.$$

Where the location of the first user sync mark is approximately $2/11$ of the way between the surrounding servo address marks, the above equation reduces to:

$$\text{Relative User } Sync \text{ Offset} = (7004-7000)*Td - \frac{(3202-3200)*2 + (3001-3000)*1}{11} Ts = 4Td - \frac{5}{11} Ts$$

Figure 5:
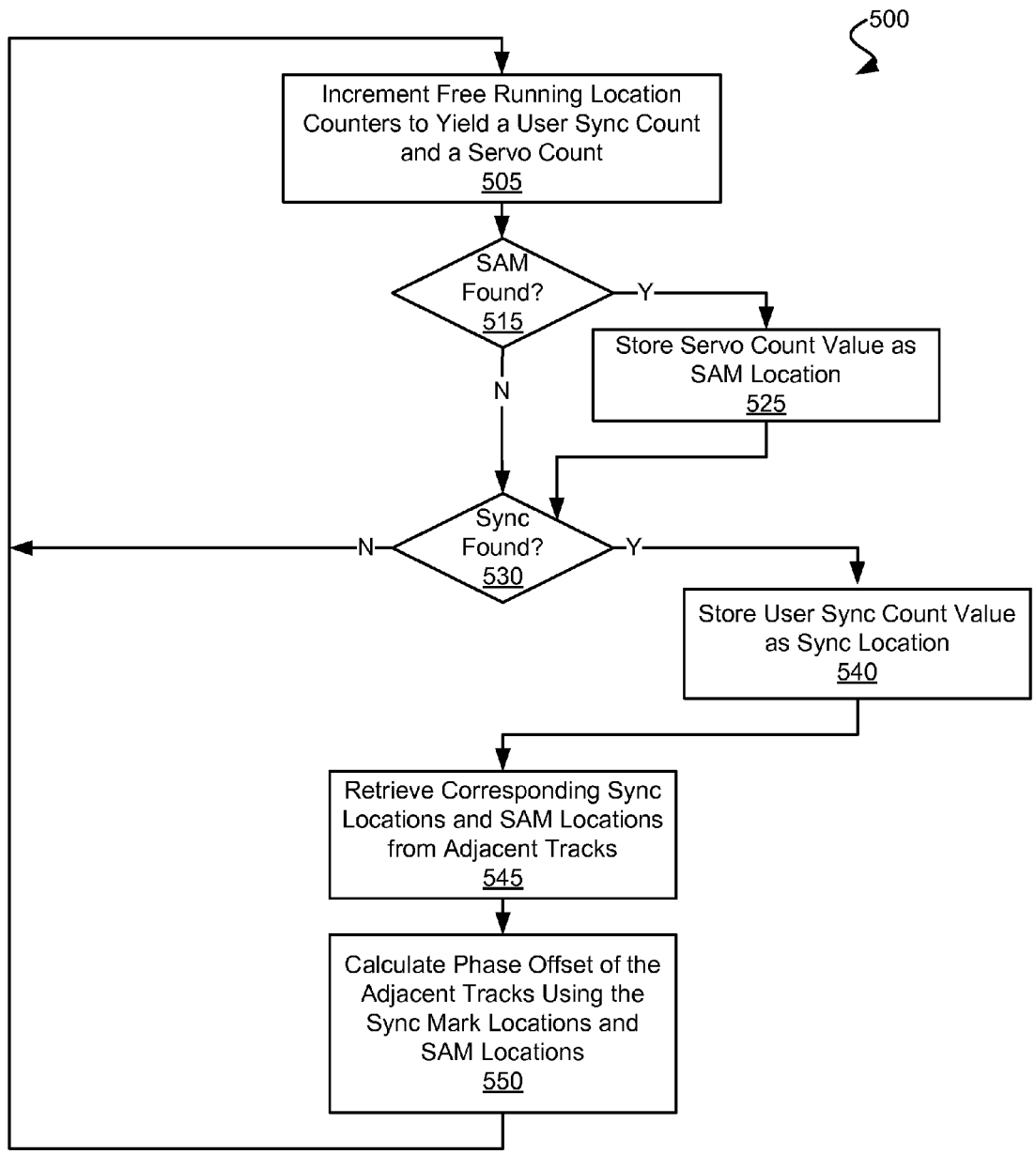
FIG. 5 is a flow diagram showing a method in accordance with some embodiments of the present invention for inter-track alignment.

Turning to FIG. 5, a flow diagram 500 shows a method in accordance with some embodiments of the present invention for inter-track alignment. Following flow diagram 500 free running counters are incremented (block 505). One of the free running counters is incremented synchronous to a servo data clock to yield a servo count, and the other free running clock is incremented synchronous to a user data clock to yield a user sync count. The free running counters are designed to roll over when the total number of bits correspond to a defined length. Thus, for example, where the servo wedge has one thousand bit periods of length Ts, the servo to servo region has ten thousand user data clock bit periods of length Td, and the length of Ts is twice that of Td, the free running counter incremented by user data clock may be designed to roll over at twelve thousand bit cycles of length Td and the free running counter incremented by servo data clock may be designed to roll over at six thousand bit cycles of length Ts. It is determined whether a servo wedge is being processed and whether a servo address mark has been found (block 515). The servo address mark may be found, for example, by identifying a servo address mark pattern in a data input. Where a servo address mark is found (block 515), the servo count is stored as a SAM location (block 525).

Where a servo address mark is not found (block 515), it is determined whether a user sync mark is found (block 530). The user sync mark may be found, for example, by identifying a user sync mark pattern in a data input. Where a user sync mark is found (block 530), the user sync count is stored as a sync location (block 540). The stored sync locations and SAM locations are accessed for adjacent tracks (block 545).

Phase offsets for the adjacent tracks are then calculated using the corresponding sync locations and SAM locations (block 550). In particular, a servo address mark offset may be calculated in accordance with the following equation:

Servo Address Mark Offset (SAM Offset)=SAM Location for track $N$–SAM Location for track $N$+1.

The SAM offset corresponding to a first servo wedge is referred to as SAM Offset A, and a SAM offset corresponding to a subsequent servo wedge is referred to as SAM Offset B. Of note, servo address marks for successive tracks are assumed to be aligned and any offset is an indication of clock drift and not an actual physical offset.

User sync mark offsets are calculated in accordance with the following equation:

User Sync Mark Offset (Sync Offset)=Sync Location for track $N$–SAM Location for track $N$+1.

Of note, multiple user sync marks may occur between two successive servo address marks (i.e., servo wedges. In such a case, the offset corresponding to the first user sync mark is referred to as Sync Offset A, the offset corresponding to the next user sync mark is referred to as Sync Offset B, and so on for each successive user sync mark. The sync offsets may indicate a combination of clock drift and actual physical offset.

The aforementioned sync offsets and SAM offset are used together to calculate an offset at a given bit period using multiple user sync marks occurring between servo wedges in accordance with the following equation:

$$\text{Offset at Bit Period } X = \frac{(\text{Sync Offset } B)*X + (\text{Sync Offset } A)*(RMOD - X)}{RMOD}Td - \frac{(SAM \text{ Offset } B)*Xs + (SAM \text{ Offset } A)*(SMOD - Xs)}{SMOD}Ts$$

where X is the bit period or location of interest and is expressed in terms of the number of bit periods after a user sync mark where track alignment is to be determined; Xs is the bit period or location of X in terms of how many servo bit periods (i.e., counts of servo data clock) from a preceding servo address mark; RMOD is the number of bit periods between the user sync marks (SM) on either side of the bit period X (i.e., the number of user bit periods between the user sync mark corresponding to Sync Offset B and the user sync mark corresponding to Sync Offset A); SMOD is the number of servo bit periods between the servo address marks on either side of the bit period X; Td is the period of the user data clock; and Ts is the period of the servo data clock. The same example shown above in relation to FIG. 4b may be used here for explanation.

Where only relative sync alignment is desired, a similar approach to that discussed above may be implemented in a track to track offset calculation circuit. Such an approach involves calculating a first distance from a servo address mark in a first track to a user sync mark in the same track, and calculation a second distance from a servo address mark in a second track to a user sync mark in the same track. The difference between the first distance and the second distance is the relative offset of the second track relative to the first track at the location of the user sync mark in the second track. As each track may include multiple user sync marks between given servo wedges, it is useful to compare the most closely located user sync mark in the first track and the second track. In particular, relative user sync mark offset may be calculated in accordance with the following equation that accounts for clock drift:

Relative User Sync Offset=(Sync Offset $A$–Sync Offset $B$)*$Td$, where the term Sync Offset A is the number of data clock periods between a particular servo wedge SAM and a user data sync mark which follows the SAM in track A, and Sync Offset B is the number of data clock periods between a particular servo wedge SAM and a user data sync mark which follows the SAM in track B. Note that this equation ignores any mis-alignment between the SAM positions in track A and track B which may be acceptable if the servo wedges were originally written within a known small maximum tolerance for servo track to track misalignment. In some cases, the user data clock frequency and period relative to the disk velocity may be slightly different from one revolution of the disk to the next. To compensate for this, the above mentioned equation may be modified as follows:

Relative User Sync Offset=(Sync Offset $A$)($Td$+$Tea$)–(Sync Offset $B$)($Td$+$Teb$), where Tea is the clock period error of the data clock when track A is read and Teb is the clock period error of the data clock when track B is read.

Figure 6:
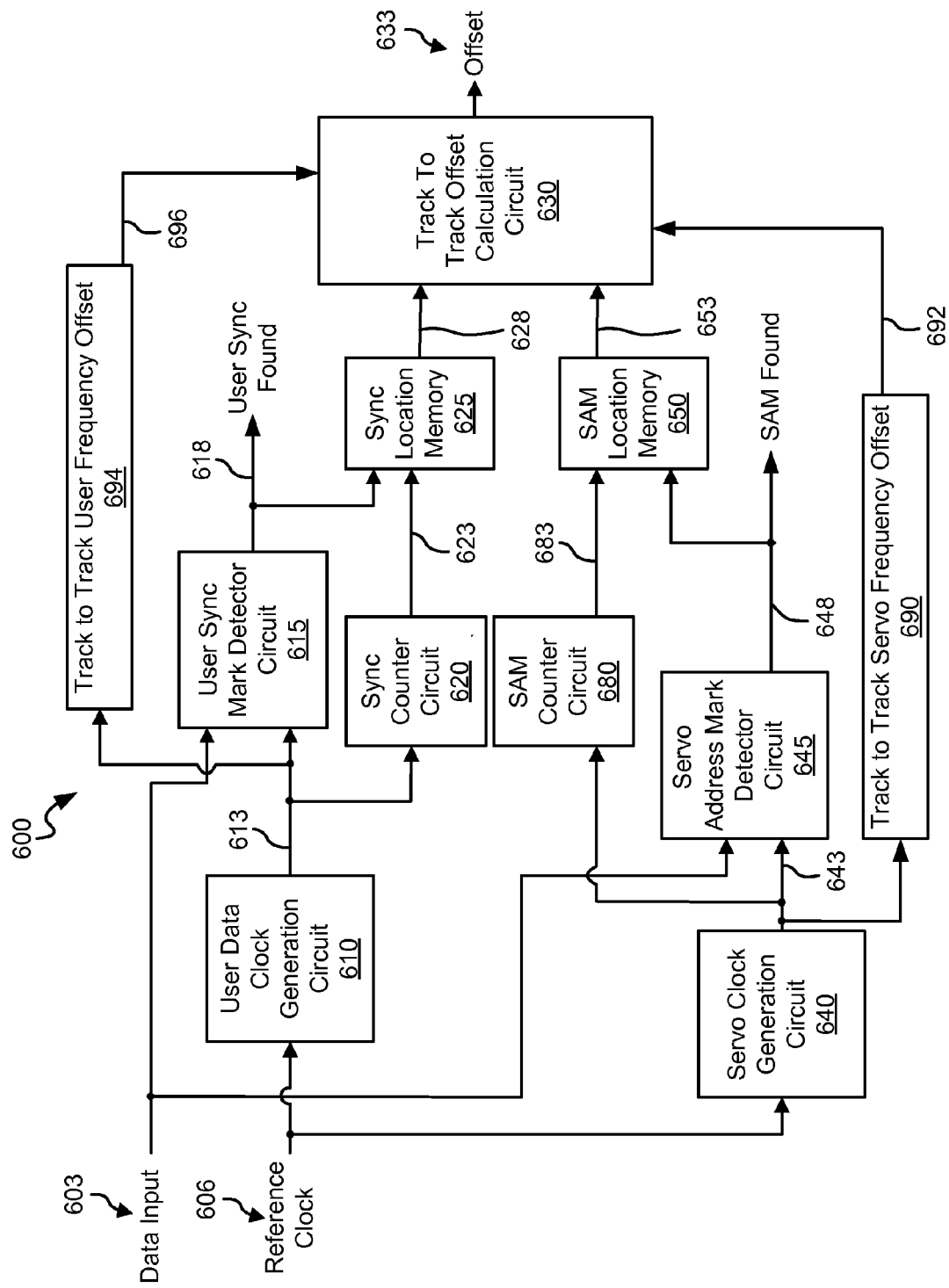
FIG. 6 depicts yet another inter-track alignment circuit in accordance with some embodiments of the present invention.

Turning to FIG. 6, yet another inter-track alignment circuit 600 is depicted in accordance with some embodiments of the present invention. In contrast to the circuit of FIG. 3 and FIG. 4 above, inter-track alignment circuit 600 calculates relative track locations accounting for a difference in clock frequency between tracks. It is assumed that the servo address marks are aligned from track to track, and that any offset is due to clock drift between tracks, and the offset is used to compensate for the difference in clock frequency between tracks.

Inter-track alignment circuit 600 includes a user data clock generation circuit 610 that receives a data input 603 and a reference clock 606. Data input 603 is digital data derived from a storage medium, and includes both user data and servo data. As just one example, user data input 603 may be similar to the data from track 20 described in FIG. 1 above including servo data portions (i.e., servo data 10a and servo data 10b) with a user data portion (i.e., user data 16a) there between. The user data portion includes one or more sync marks (i.e., sync mark 17a). Based upon the disclosure provided herein, one of ordinary skill in the art will recognize a variety of formats of data input 603 that may be used in relation to different embodiments of the present invention. User data clock generation circuit 610 generates a user data clock 613 that exhibits the phase and frequency of a user data portion included in data input 603. User data clock generation circuit 610 may be any circuit known in the art that is capable of generating a clock with a phase and frequency corresponding to an input data set. In some embodiments of the present invention, user data clock generation circuit 610 may be a digital phase lock loop circuit as is known in the art that is capable of generating a clock with a phase and frequency aligned to data input 603. Based upon the disclosure provided herein, one of ordinary skill in the art will recognize a variety of circuits that are capable of generating a clock synchronized to an input data stream.

Inter-track alignment circuit 600 includes a user sync mark detector circuit 615 that queries a user data portion of data input 603 synchronous to user data clock 613 to identify a user sync mark (e.g., user sync mark 17a of user data region 16a). When a user sync mark is identified, user sync mark detector circuit 615 asserts a user sync found signal 618. Any circuit known in the art for identifying a user sync mark may be used in relation to embodiments of the present invention.

In addition, inter-track alignment circuit 600 includes a servo clock generation circuit 640 that receives data input 603 and reference clock 606. Servo clock generation circuit 640 generates a servo data clock 643 that exhibits the phase and frequency of a servo data portion included in data input 603. Servo clock generation circuit 640 may be any circuit known in the art that is capable of generating a clock with a phase and frequency corresponding to an input data set. In some embodiments of the present invention, servo clock generation circuit 640 may be a digital phase lock loop circuit as is known in the art that is capable of generating a clock with a phase and frequency aligned to data input 603. Based upon the disclosure provided herein, one of ordinary skill in the art will recognize a variety of circuits that are capable of generating a clock synchronized to an input data stream.

User data clock 613 is provided to a track to track user frequency offset calculation circuit 694 that calculates a frequency offset between a user data clock generated for processing a prior track and user data clock 613. The difference is expressed as a ratio of the two clocks and provided as a user data clock ratio 696. Similarly, servo data clock 643 is provided to a track to track servo frequency offset calculation circuit 690 that calculates a frequency offset between a servo data clock generated for processing a prior track and servo data clock 643. The difference is expressed as a ratio of the two clocks and provided as a servo data clock ratio 692.

Inter-track alignment circuit 600 includes a servo address mark detector circuit 645 that queries a servo data portion of data input 603 synchronous to servo data clock 643 to identify a servo address mark (e.g., SAM 12 of servo data 10a). When a servo address mark is identified, servo address mark detector circuit 645 asserts a SAM found signal 648. Any circuit known in the art for identifying a user sync mark may be used in relation to embodiments of the present invention.

A sync counter circuit 620 is included that is a free running counter that is incremented upon each assertion of user data clock 613 until a maximum value is achieved and then rolls over to zero. The maximum may be set to the number of bit periods in a user data region between servo wedges. The value of sync counter circuit 620 is provided as a count output 623 to a sync location memory 625 where it is stored each time user sync mark found 618 is asserted. A SAM counter circuit 680 is included that is a free running counter that is incremented upon each assertion of servo data clock 643 until a maximum value is achieved and then rolls over to zero. The maximum may be set to the number of bit periods in a servo wedge. The value of SAM counter circuit 680 is provided as a count output 483 to a SAM location memory 650 where it is stored each time SAM found 648 is asserted. The values stored in sync location memory 625 are provided to a track to track offset calculation circuit 630 as sync locations 628, and the values stored in SAM location memory 650 are provided to a track to track offset calculation circuit 630 as SAM locations 653.

Track to track offset calculation circuit 630 calculates an offset between corresponding servo address marks using stored SAM locations 653 from adjacent tracks, and calculates offsets between corresponding user sync marks using stored sync locations 628 from adjacent tracks. A combination of the aforementioned offsets are used together to calculate a user data offset at a given bit period which is provided as an offset output 633. Servo address mark offset may be calculated in accordance with the following equation:

Servo Address Mark Offset (SAM Offset)=(SAM Location 653 for track N–SAM Location 653 for track N+1)*(servo data clock ratio 692).

Multiplication by servo data clock ratio 692 accounts for clock frequency difference between track N and track N+1. The SAM offset corresponding to a first servo wedge is referred to as SAM Offset A, and a SAM offset corresponding to a subsequent servo wedge is referred to as SAM Offset B. Of note, servo address marks for successive tracks are assumed to be aligned and any offset is an indication of clock drift and not an actual physical offset.

User sync mark offsets may be calculated in accordance with the following equation:

User Sync Mark Offset (Sync Offset)=(Sync Location 623 for track N–SAM Location 623 for track N+1)*(user data clock ratio 696).

Multiplication by user data clock ratio 696 accounts for clock frequency difference between track N and track N+1. Of note, multiple user sync marks may occur between two successive servo address marks (i.e., servo wedges. In such a case, the offset corresponding to the first user sync mark is referred to as Sync Offset A, the offset corresponding to the next user sync mark is referred to as Sync Offset B, and so on for each successive user sync mark. The sync offsets may indicate a combination of clock drift and actual physical offset. Of note, while the present embodiment is described as applying both user data clock ratio 696 and servo data clock ratio 692, in some cases only one or the other ratio may be applied with the other ratio being set to unity.

The aforementioned sync offsets and SAM offset are used together to calculate an offset at a given bit period using multiple user sync marks occurring between servo wedges in accordance with the following equation:

$$\text{Offset at Bit Period } X = \frac{(Sync \text{ Offset } B)*X + (Sync \text{ Offset } A)*(RMOD - X)}{RMOD} Td - \frac{(SAM \text{ Offset } B)*Xs + (SAM \text{ Offset } A)*(SMOD - Xs)}{SMOD} Ts$$

where X is a location of interest expressed in terms of the number of bit periods after a user sync mark where track alignment is to be determined; Xs is the bit period or location of X in terms of how many servo bit periods (i.e., counts of servo data clock 643) from a preceding servo address mark; RMOD is the number of bit periods between the user sync marks (SM) on either side of the bit period X (i.e., the number of user bit periods between the user sync mark corresponding to Sync Offset B and the user sync mark corresponding to Sync Offset A); SMOD is the number of servo bit periods between the servo address marks on either side of the bit period X; Td is the period of user data clock 613; and Ts is the period of servo data clock 643.

Offset 633 may be provided to an inter-track interference mitigation circuit (not shown) where it is used to select the appropriate data (i.e., bit periods) from preceding and/or succeeding tracks for a given bit period in the current read track for use in calculating and mitigating inter-track interference. As an example, inter-track interference may be calculated and compensated using circuits and/or approaches discussed in U.S. Provisional Patent App. No. 61/453,676 entitled "Systems and Methods for Track to Track Interference Compensation" and filed Mar. 17, 2011 by Mathew et al. The entirety of the aforementioned application is assigned to an entity common hereto and is incorporated herein by reference for all purposes.

As an example, suppose that data input 603 includes data from a Track N with a first servo data portion and a second servo data portion each including servo data, and a user data portion between the first servo data portion and the second servo data portion that includes two user sync marks (SM) interspersed between user data, and data from a Track N+1 also with a first servo data portion and a second servo data portion each including servo data, and a user data portion between the first servo data portion and the second servo data portion that includes two user sync marks (SM) interspersed between user data. In such an example, sync location memory 625 stores two distances (First User Sync Mark Time Stamp and Second User Sync Mark Time Stamp) and SAM location memory 650 stores two distances (First SAM Time Stamp and Second SAM Time Stamp as shown in the following table with example values.

| Track Number | First User Sync Mark Time Stamp | Second User Sync Mark Time Stamp | First SAM Time Stamp | Second SAM Time Stamp |
|---|---|---|---|---|
| Track N | 7000 | 7120 | 3000 | 3200 |
| Track N + 1 | 7004 | 7128 | 3001 | 3202 |

Using these values, relative alignments of the first sync marks and the second sync marks can be calculated in accordance with the following equations:

$$\text{Bit } X \text{ Alignment} = \frac{(7128-7120)*X + (7004-7000)*(RMOD-X)}{RMOD} Td - \frac{(3202-3200)*Xs + (3001-3000)*(SMOD-Xs)}{SMOD} Ts.$$

Where Bit X (i.e., the bit location of interest) is located, for example, 4/7 of the distance between the first servo address mark and the second servo address mark, the above mentioned equation simplifies to:

$$\text{Bit } X \text{ Alignment} = \frac{(7128-7120)*X + (7004-7000)*(RMOD-X)}{RMOD} Td - \frac{(3202-3200)*4 + (3001-3000)*3}{7} Ts.$$

In this case, the terms Xs and (SMOD-Xs) are used to effectively perform a linear interpolation based upon how many servo data clock periods lie between the identified servo address marks which come before and after the point of interest. As such, the sum of the two numbers in the numerator Xs and (SMOD-Xs) is equivalent to the number in the denominator SMOD. Further, where the Bit X (i.e., the bit location of interest) is located, for example, 3/5 of the distance between the first user sync mark and the second user sync mark, the above mentioned equation simplifies to:

$$\text{Bit } X \text{ Alignment} = \frac{(7128-7120)*3 + (7004-7000)*2}{5} Td - \frac{(3202-3200)*4 + (3001-3000)*3}{7} Ts$$

$$= \frac{16}{5} Td - \frac{5}{7} Ts$$

In this case, the terms X and (RMOD-X) are used to effectively perform a linear interpolation based upon how many user data clock periods lie between the identified user sync marks which come before and after the point of interest. As such, the sum of the two numbers in the numerator X and (RMOD-X) is equivalent to the number in the denominator RMOD.

It should be noted that the various blocks discussed in the above application may be implemented in integrated circuits along with other functionality. Such integrated circuits may include all of the functions of a given block, system or circuit, or only a subset of the block, system or circuit. Further, elements of the blocks, systems or circuits may be implemented across multiple integrated circuits. Such integrated circuits may be any type of integrated circuit known in the art including, but are not limited to, a monolithic integrated circuit, a flip chip integrated circuit, a multichip module integrated circuit, and/or a mixed signal integrated circuit. It should also be noted that various functions of the blocks, systems or circuits discussed herein may be implemented in either software or firmware. In some such cases, the entire system, block or circuit may be implemented using its software or firmware equivalent. In other cases, the one part of a given system, block or circuit may be implemented in software or firmware, while other parts are implemented in hardware.

In conclusion, the invention provides novel systems, devices, methods and arrangements for performing data processing. While detailed descriptions of one or more embodiments of the invention have been given above, various alternatives, modifications, and equivalents will be apparent to those skilled in the art without varying from the spirit of the invention. Therefore, the above description should not be taken as limiting the scope of the invention, which is defined by the appended claims.

What is claimed is:

1. A data processing circuit, the circuit comprising:
a servo address mark count circuit operable to provide: a first count corresponding to a first servo address mark within a first track on a storage medium, a second count corresponding to a second servo address mark within the first track, a third count corresponding to a third servo address mark within a second track of the storage medium, and a fourth count corresponding to a fourth servo address mark within the second track;
a user sync mark count circuit operable to provide: a fifth count corresponding to a first user sync mark within the first track, and to provide a sixth count corresponding to a second user sync mark within the second track; and
an offset calculation circuit operable to calculate an offset between the first track and the second track based at least in part on the first count, the second count, the third count, the fourth count, the fifth count, and the sixth count.

2. The circuit of claim 1, wherein the circuit further comprises:
   a user sync mark detector circuit operable to identify a user sync mark pattern in a data set derived from the storage medium.

3. The circuit of claim 2, wherein the user sync mark count circuit comprises:
   a user data clock generation circuit operable to provide a user data clock synchronized to a user data set derived from the storage medium;
   a sync counter circuit operable to increment upon assertion of the user data clock to yield a sync count; and
   a sync location memory operable to store the sync count upon identification of the user sync mark pattern.

4. The circuit of claim 1, wherein the circuit further comprises:
   a servo address mark detector circuit operable to identify a servo address mark in a data set derived from the storage medium.

5. The circuit of claim 4, wherein the servo address mark count circuit comprises:
   a servo clock generation circuit operable to provide a servo data clock synchronized to a servo data set derived from the storage medium;
   a servo counter circuit operable to increment upon assertion of the servo data clock to yield a servo count; and
   a servo address mark location memory operable to store the servo count upon identification of the servo address mark.

6. The circuit of claim 1, wherein the offset calculation circuit is operable to calculate a difference between the fifth count and the sixth count to yield a sync offset.

7. The circuit of claim 6, wherein the offset calculation circuit is further operable to calculate a difference between the first count and the third count to yield a first servo address mark offset, and to calculate a difference between the second count and the fourth count to yield a second servo address mark offset.

8. The circuit of claim 7, wherein the offset calculation circuit is further operable to calculate the offset between the first track and the second track at the second user sync mark in accordance with the following equation:

$$\text{Sync Offset} * Td - \frac{(\text{Second } SAM \text{ Offset}) * Xs + (\text{First } SAM \text{ Offset}) * (SMOD - Xs)}{SMOD} Ts,$$

wherein Xs is the location corresponding to the second user sync mark expressed in clock periods of a servo data clock from the third servo address mark, SMOD is the number of bit periods of the servo data clock between the third servo address mark and the fourth servo address mark, Td is the period of the user data clock, and Ts is the period of the servo data clock.

9. The circuit of claim 7, wherein the a user sync mark count circuit is further operable to provide a seventh count corresponding to a third user sync mark within the first track, and to provide a eighth count corresponding to a fourth user sync mark within the second track; wherein the sync offset is a first sync offset, wherein the offset calculation circuit is further operable to calculate a difference between the seventh count and the eighth count to yield a second sync offset; and wherein the offset calculation circuit is further operable to calculate the offset between the first track and the second track at X between the second user sync mark and the fourth user sync mark in accordance with the following equation:

$$\frac{(\text{Second } Sync \text{ Offset}) * X + (\text{First } Sync \text{ Offset}) * (RMOD - X)}{RMOD} Td - \frac{(SAM \text{ Offset } B) * Xs + (SAM \text{ Offset } A) * (SMOD - Xs)}{SMOD} Ts,$$

wherein X is the bit period in the second track expressed in clock periods of a user data clock from the second user sync mark within the second track, Xs is the location corresponding to the second user sync mark expressed in clock periods of a servo data clock from the third servo address mark, SMOD is the number of bit periods of the servo data clock between the third servo address mark and the fourth servo address mark, RMOD is the number of bit periods of the user data clock between the second user sync mark and the fourth user sync mark, Td is the period of the user data clock, and Ts is the period of the servo data clock.

10. The circuit of claim 1, wherein the offset calculation circuit compensates for clock drift between the first track and the second track.

11. The circuit of claim 10, wherein the first track and the second track are adjacent.

12. The circuit of claim 1, wherein the circuit is implemented as part of an integrated circuit.

13. The circuit of claim 1, wherein the circuit is implemented as part of a storage device.

14. A data processing circuit, the circuit comprising:
   a location marking circuit operable to provide: a first count corresponding to a first servo address mark within a first track on a storage medium, a second count corresponding to a second servo address mark within the first track, a third count corresponding to a third servo address mark within a second track of the storage medium, a fourth count corresponding to a fourth servo address mark within the second track; a fifth count corresponding to a first user sync mark within the first track, a sixth count corresponding to a second user sync mark within the second track; and
   an offset calculation circuit operable to calculate an offset between the first track and the second track based at least in part on the first count, the second count, the third count, the fourth count, the fifth count, and the sixth count.

15. The circuit of claim 14, wherein the circuit further comprises:
   a user sync mark detector circuit operable to identify a user sync mark pattern in a data set derived from the storage medium; and
   a servo address mark detector circuit operable to identify a servo address mark in a data set derived from the storage medium.

16. The circuit of claim 15, wherein the location marking circuit comprises:
   a user data clock generation circuit operable to provide a user data clock synchronized to a user data set derived from the storage medium;
   a servo address mark to user sync mark counting circuit operable to reset upon identification of the servo address mark and to increment upon assertion of the user data clock to yield a count output;
   a sync location memory operable to store the count output upon identification of the user sync mark pattern, wherein the count output is one of the fifth count and the sixth count; and a servo address mark location memory operable to store the count output upon identification of the servo address mark.

17. The circuit of claim 14, wherein the offset calculation circuit compensates for clock drift between the first track and the second track.

18. The circuit of claim 17, wherein the first track and the second track are adjacent.

19. The circuit of claim 14, wherein the circuit is implemented as part of an integrated circuit.

20. The circuit of claim 14, wherein the circuit is implemented as part of a storage device.

21. The circuit of claim 14, wherein the offset calculation circuit is operable to calculate a difference between the fifth count and the sixth count to yield a sync offset.

22. The circuit of claim 21, wherein the offset calculation circuit is further operable to calculate a difference between the first count and the third count to yield a first servo address mark offset, and to calculate a difference between the second count and the fourth count to yield a second servo address mark offset.

23. The circuit of claim 22, wherein the offset calculation circuit is further operable to calculate the offset between the first track and the second track at the second user sync mark in accordance with the following equation:

$$\text{Sync Offset} * Td - \frac{(\text{Second } SAM \text{ Offset}) * Xs + (\text{First } SAM \text{ Offset}) * (SMOD - Xs)}{SMOD} Ts,$$

wherein Xs is the location corresponding to the second user sync mark expressed in clock periods of a servo data clock from the third servo address mark, SMOD is the number of bit periods of the servo data clock between the third servo address mark and the fourth servo address mark, Td is the period of the user data clock, and Ts is the period of the servo data clock.

24. The circuit of claim 22, wherein the a user sync mark count circuit is further operable to provide a seventh count corresponding to a third user sync mark within the first track, and to provide a eighth count corresponding to a fourth user sync mark within the second track; wherein the sync offset is a first sync offset, wherein the offset calculation circuit is further operable to calculate a difference between the seventh count and the eighth count to yield a second sync offset; and wherein the offset calculation circuit is further operable to calculate the offset between the first track and the second track at X between the second user sync mark and the fourth user sync mark in accordance with the following equation:

$$\frac{(\text{Second } Sync \text{ Offset}) * X + (\text{First } Sync \text{ Offset}) * (RMOD - X)}{RMOD} Td - \frac{(SAM \text{ Offset } B) * Xs + (SAM \text{ Offset } A) * (SMOD - Xs)}{SMOD} Ts,$$

wherein X is the bit period in the second track expressed in clock periods of a user data clock from the second user sync mark within the second track, Xs is the location corresponding to the second user sync mark expressed in clock periods of a servo data clock from the third servo address mark, SMOD is the number of bit periods of the servo data clock between the third servo address mark and the fourth servo address mark, RMOD is the number of bit periods of the user data clock between the second user sync mark and the fourth user sync mark, Td is the period of the user data clock, and Ts is the period of the servo data clock.

25. A storage device, the storage device comprising:
a storage medium including a first track and a second track;
a head assembly disposed in relation to the storage medium and operable to generate an analog input corresponding to information on the storage medium;
a read channel circuit operable to receive the analog input and to provide a first data set corresponding to the first track and a second data set corresponding to the second track, the read channel circuit including:
a servo address mark count circuit operable to provide: a first count corresponding to a first servo address mark within the first data set, a second count corresponding to a second servo address mark within the first data set, a third count corresponding to a third servo address mark within the second data set, and a fourth count corresponding to a fourth servo address mark within the second data set;
a user sync mark count circuit operable to provide: a fifth count corresponding to a first user sync mark within the first data set, and to provide a sixth count corresponding to a second user sync mark within the second data set; and
an offset calculation circuit operable to calculate an offset between the first data set and the second data set based at least in part on the first count, the second count, the third count, the fourth count, the fifth count, and the sixth count.

* * * * *